Aug. 7, 1945.  E. F. CHANDLER  2,381,111
SELF-LOCKING NUT
Filed May 25, 1943
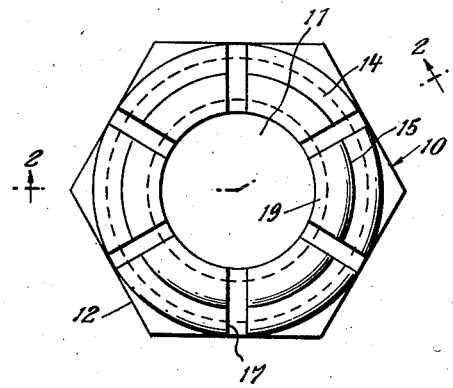
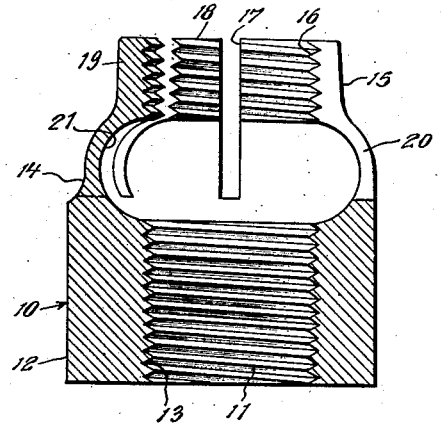
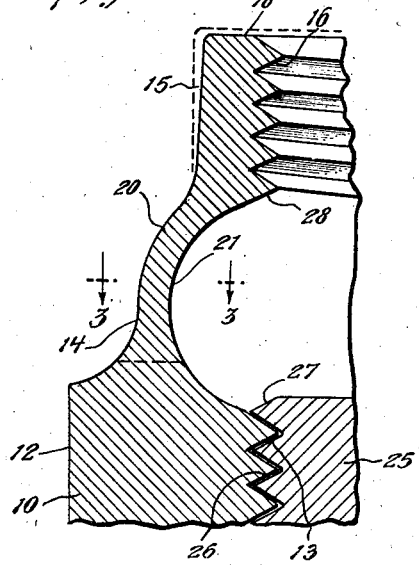
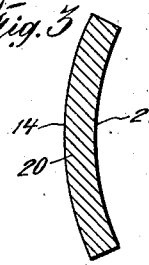
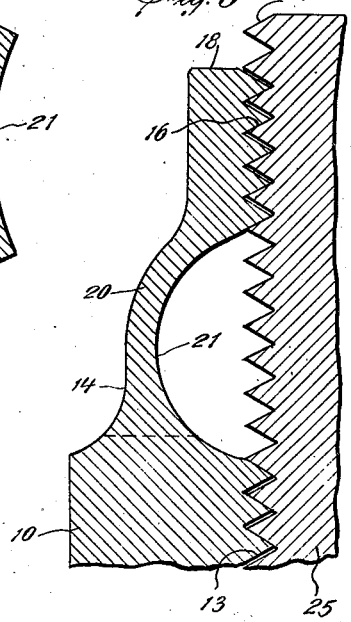
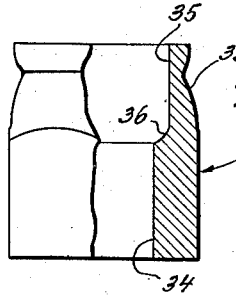
INVENTOR.
Edward F. Chandler
BY John P. Chandler
His Attorney Patented Aug. 7, 1945

2,381,111

UNITED STATES PATENT OFFICE 2,381,111

SELF-LOCKING NUT

Edward F. Chandler, Brooklyn, N. Y.

Application May 25, 1943, Serial No. 488,351

3 Claims. (Cl. 151—21)

This invention relates to self-locking nuts and other threaded locking devices, and relates more particularly to articles of this character wherein the locking of the nut onto the bolt is effected by the axial displacement between two axially-positioned, internally and similarly-threaded portions of the article, which portions are normally resiliently held so that the threads therein are relatively out of phase, and in which movement tending to re-establish the phase is caused when the nut is screwed onto the bolt. The present application contains matter related to the subject matter of my co-pending application Serial No. 450,505.

Heretofore, in devices of this general character, the two axially-positioned, threaded portions have been so constructed that, for instance, in the case of a nut, the total load of moving said portions into substantial phase relationship must be carried by the leading thread of the entering bolt. Because of the excessive load thus imposed upon the threads of the engaging members, devices thus constructed are objectionable and impractical and tend to injure the engaging threads. In an effort to overcome the various objections, efforts have been made to increase the resiliency of the part of the nut holding the two threaded portions axially and out of phase with each other. For example, instead of depending upon the entering bolt actually stretching or bending the metal connecting part, horizontal slots, cut therein, have been suggested as a means for affording some degree of spring action therein. Reducing the load in this manner, however, tends to reduce the holding or locking power of the nut.

In the present invention, these objectionable features have been overcome by so forming the nut that the power necessary for reestablishing the phase relationship between the threads of the two threaded portions is applied progressively, step by step, as the nut is screwed onto the bolt. In this manner, the total, ultimate load which resists the re-establishment of said phase relationship is sufficiently great to afford a powerful, vise-like locking grip. The nut may be applied and removed as often as is necessary without any appreciable injury to the threaded parts, and, as the deformation which causes the self-locking action does not tend to become permanent, the gripping power of the nut remains relatively constant and uniform. Preferably, the primary locking effect takes place axially, as will be understood from the foregoing remarks. However, this may, and preferably is, augmented by a laterally-exerted, circumferential hugging action as well.

It will thus be seen that the two thread sections are so disposed with respect to each other that the respective threads are normally out of phase. In one form of nut embodying the present invention, these results are obtained by so forming the part of the nut which connects the two, internally-threaded portions, as to provide a web of substantially uniform thickness from the point where it joins the body of the nut to its connection with its other internally-threaded portion. This last said internally-threaded portion and said web are divided by a plurality of longitudinal slots, thus forming a plurality of jaw-like segments. The unthreaded web portion which separates the two threaded portions is of an internal diameter sufficiently greater than the thread diameter to form a relatively deep throat below each jaw-like segment, while, at the same time, imparting to said web, connecting each jaw-like segment with the body of the nut, the properties of resiliency, thus permitting both an axial movement of the threaded jaw-like segments and also an arcuate movement radially with respect to the axis of the nut.

In a nut of this character, it will be seen that when the same is screwed upon a bolt, the leading thread of the bolt will engage consecutively the first thread of each of the threaded jaw-like segments, camming them axially to ultimately restore the phase relationship of the threads carried thereby with those in the body of the nut. Because of the segmental formation of this thread-carrying portion of the nut, it is possible, when deforming the nut, to set the threads of the thread-carrying portions out of phase with each other, to at the same time tip the thread-carrying faces of the segments angularly with respect to the axis of the nut, and so as to restrict the threaded bore of the nut at its outer face. Accordingly, screwing the nut on the bolt is resisted by the compound effect due to the displacement of the two threaded portions relative to each other and by the lateral displacement of the radially positioned, jaw-like segments, restricting the threaded bore of the nut at or near its outer end.

Heretofore, in devices of this general order, in which a plurality of threaded, jaw-like segments have been employed as the sole source of locking or gripping action, the results have been generally unsuccessful. This is attributed, among other things, to the lack of resiliency because the bending moment was localized at substantially a single point generally situated at or near where the segmental member joined the body of the nut. Accordingly, a bending of the metal at this point took place instead of a spring-like action. This resulted in deformation and loss of locking or gripping power.

In the present invention, this and other previously-noted objections have been overcome by forming the connecting portion between the two previously-mentioned axially-positioned, threaded portions into a resilient element of sufficient length, and so proportioned as to permit the distribution throughout said length of the increments of movement incidental to the locking or gripping action. This resilient element is characterized by being arcuate in profile and in horizontal cross-section, and of greater width at the base where it joins the body of the nut than at its upper terminal. By this means, a powerful locking action is afforded without placing the material composing the resilient element under objectionable stresses at any point, thus eliminating the danger of breakage or fixed deformation of the locking elements.

Self-locking nuts and other threaded locking devices may be constructed in accordance with the inventive idea herein disclosed from a single piece of metal or other material, as, for example, in a screw machine from bar stock, or the same may be made from sheet metal, as, for example, from suitable dies in a power-press.

In the drawing:

Fig. 1 is a plan view of a locking nut embodying the present invention.

Fig. 2 is a longitudinal section taken on line 2—2 of Fig. 1.

Fig. 3 is a section taken on line 3—3 of Fig. 4.

Fig. 4 is a broken longitudinal section taken through the nut and a portion of the entering bolt before the leading thread thereof has reached the auxiliary thread section.

Fig. 5 is similar to Fig. 4, but illustrates the relation of several thread surfaces when the nut is in full locking position.

Fig. 6 is a longitudinal section taken through a blank showing one way of forming the lock nut of the present invention.

Referring now particularly to Figs. 1 and 2, it will be noted that the nut body 10 may be formed with a central, longitudinal bore 11 and a non-circular, wrench-receiving exterior 12, although, of course, it may have a circular exterior in certain instances. At its lower end, the bore 11 is threaded to form the lower or main thread section 13. Starting at the upper end of the wrench-receiving section 12, the nut has a reduced portion 14 of generally circular external contour, and a further reduced portion 15 at its upper end, thus giving the nut a cylindro-dome-shaped head. Above the upper end of the main thread section 13, there is provided an internal annular recess 21, which, it will be noted, is of greater diameter than the diameter of the main thread section 13. The upper, annular, terminal portion 15 of the nut is formed with an auxiliary thread section 16, and such section is further formed with a plurality of longitudinally-disposed, spaced slots 17 which extend from the upper edge 18 downwardly well into the portion defined by recess 21.

The nut thus far described may be formed in a plurality of ways, of which one may be to form a blank having the contour of the nut shown in Fig. 2. The internal recess 21 may then be formed within the bore 11, and such bore threaded from end to end with a single tap. Slots 17 may then be cut into the upper section with a milling cutter or other equivalent means. The final step is to move the upper thread section 16 out of phase with the upper thread section 13, as by means of a punch-press operation which moves against the upper surface 18 of the upper thread section. This produces the result clearly shown in Fig. 4, wherein the upper edge 18 has been moved downwardly a slight distance, thus moving the entire thread section 16 also slightly downwardly, and the individual jaw members 19 are also moved slightly inwardly. The showing of Fig. 4 is, of course, exaggerated, inasmuch as the downward positioning need only be a matter of a few thousandths of an inch. The broken lines in Fig. 4 show the approximate position of the upper edge 18 and the adjacent peripheral edge before the deforming operation.

Particular attention is directed to the webs 20 forming the connecting portions between the lower or body portion of the nut, and the jaw sections 19 forming the upper thread section. When viewed longitudinally, as in Fig. 2, the exterior 14 of this web is convex, and the interior 21 is concave. This formation has a decided advantage in the nut of the present invention, for the reason that when the jaw sections are moved upwardly and slightly outwardly when thread phase is being reestablished, due to the introduction of the bolt, the bending movement is distributed throughout the entire length of the web. This clearly distinguishes the nut of the present invention from some of the earlier devices of the art having castellated upper thread sections wherein the entire bending action occurs at one point only, and after the nut has been used a number of times, the jaw sections invariably become weakened and break off.

Referring to Fig. 3, it will be noted that the interior surface 21 of the connecting web 20, when viewed in transverse section, is likewise concave, and the exterior surface 14 is convex. This ribbed formation has a decidedly strengthening effect upon the element, and being of substantially uniform thickness, greatly prolongs the life of the jaw sections and causes them to retain their resiliency and gripping effect for a long period of time.

Referring now more particularly to Figs. 4 and 5, the externally-threaded bolt 25 receives nut 10, and there is the usual commercial clearance between the threads 26 of the bolt and the lower thread section 13 of the nut. As the nut is turned on the bolt, or vice versa, the first convolution 27 at the upper end of the bolt eventually contacts the beginning of that part of the thread 28 carried by one of the jaw sections, and by camming action starts raising it into phase relationship, and then successively picks up the next in turn, and so on, from one to the other, until the entire upper section is brought into relatively true phase relation with the threads in the lower section. From this it will be seen that the load imposed by the upper thread section on the upper convolution, or convolutions, of the bolt thread is not a single load, but, on the contrary, is divided into a plurality of loads taking place in cam-like action.

An alternative method of forming the nut blank is illustrated in Fig. 6. It was earlier pointed out that, if desired, a continuous bore of equal diameter may be made from end to end, the internal recess 21 then formed, thus dividing the upper from the lower section, and the bore then threaded. In the form shown in Fig. 6, however, the blank 32 is formed with a reduced upper portion 33, such blank further having a bore 34 which is formed at its upper end with a section 35 of increased diameter. A shoulder portion 36 may separate the respective sections of the two-diameter bore. Any appropriate forming tool or die may then be used to move the upper section 33 inwardly, thus simultaneously forming the internal annular recess and the upper bore section of the same diameter as the lower section 34. A tap may then be run through the bore, thus threading both sections simultaneously. The upper thread section is now set out of phase with the lower section in the manner previously described. This particular method of forming the nut is especially appropriate in the producing of nuts of smaller diameters, since no internal cutting tool is necessary to form the inner channel.

It will be appreciated that the novel formation of the webs which provide the connecting elements between the main body section of the nut and the segmental, internally-threaded jaw members forming the upper thread section, may be embodied in other types of castellated nuts wherein the upper thread section is not, strictly speaking, normally held out of phase with the lower or main thread section. That is to say, if the segmental jaw sections are merely set inwardly, rather than downwardly, the threads are in substantial phase with those of the main thread section, even though they exert a clamping action on the bolt. In a nut of this character, the resiliency afforded by the web construction shown and described herein makes for good locking action. When the upper thread section is set downwardly relative to the lower thread section, either with or without the slight inward setting shown in Fig. 4, superior results are achieved, and the resiliency of the jaw section is not impaired or diminished, nor are the connecting webs weakened by repeated applications of the nut to the bolt and removals of such nut therefrom.

In order to insure the uniform flexure of the relatively long, curved spring wall sections 20 throughout their length to produce an arched, spring-finger effect in these portions of the nut, the adherence to certain shape and proportions of these parts of the nut is desirable. That is to say, the curvature of the portions 20 should for the greater portion of their length be truly arcuate and curved on an arc of a circle having certain proportions relative to other parts of the nut. I have found that most satisfactory results will be obtained if the walls of the arcuately curved segments or webs 20 are curved on a true arc of a circle having a diameter greater than the length of the threaded upper section 16, thereby insuring the presentation of a relatively long, arcuately curved area on which flexure is uniformly distributed when the bolt is threaded through the relatively short upper threaded section. The proportions of the curved segments in this area to the diameter of the nut is also of importance, and my experiments have conclusively shown that a curvature of the parts 20 on an arc of a circle having a radius of approximately one-third of the bore representing the root of the thread of a bolt to be received in the thread sections, is most effective. These proportions are found in the nut illustrated in the drawing and if adhered to, will produce the most satisfactory results.

What I claim is:

1. A self-locking nut having a threaded bore and an intermediate unthreaded portion of greater diameter than the bore, dividing the bore into an upper and a lower thread section, the upper section having a plurality of spaced, longitudinally-disposed slots which extend into the unthreaded portion, thus dividing the upper part of the nut into a plurality of threaded jaw-like segments, the several segments being set downwardly and inwardly, thus positioning the threads in the upper section out of phase with those in the lower section and constricting the upper thread section, the walls of the segments in the unthreaded portion forming resilient webs connecting the threaded portions of the segments with the body of the nut, a vertical and a horizontal section through any portion of such webs presenting a wall of convex outer contour, and a concave inner contour, such walls being of substantially uniform thickness and arcuately curved on an arc of a circle having a diameter greater than the length of the upper thread section, whereby when the nut is applied to a bolt, and the thread-carrying portions of the segments are displaced upwardly and outwardly by contact with the bolt threads, such displacement deflects the resilient webs proportionally throughout substantially their entire length.

2. In a self-locking nut having a threaded bore and an intermediate unthreaded portion of greater diameter than the bore, dividing the bore into an upper and a lower thread section, the upper section having a plurality of spaced, longitudinally-disposed slots which extend into the unthreaded portion, thus dividing the upper part of the nut into a plurality of threaded jaw-like segments, the threads of the jaw-like segments being out of phase with the threads of the lower section, the walls of the unthreaded portion of the segments forming longitudinally arcuate, resilient webs of substantially uniform thickness throughout their length connecting the threaded portion of the segments with the body of the nut, the walls of the segments in the unthreaded portion being arcuately curved on an arc of a circle having a diameter greater than the length of the threaded upper portion whereby movement between the upper and lower thread sections to bring the threads of the two sections into phase as a result of applying the nut to a bolt causes relatively uniform deflection of said webs throughout substantially their entire lengths.

3. In a self-locking nut having a threaded bore, an unthreaded intermediate portion dividing the bore into an upper and a lower thread section, the internal diameter of the unthreaded portion being greater than that of the bore and formed to provide an arcuate web of substantially uniform thickness connecting the upper and lower thread sections, said web presenting an interior arcuately curved face formed on an arc of a circle having a radius of approximately one-third of the bore representing the root of the thread of a bolt to be received in the thread sections, a plurality of longitudinally disposed slots extending into the unthreaded intermediate portion and dividing the upper part of the nut into a plurality of jaw-like threaded segments, the threads carried thereby being positioned out of phase with the threads of the lower section and resiliently so retained by said web, which, when forced to yield upon the application of the nut to a bolt, is deflected throughout its arcuate span.

EDWARD F. CHANDLER.